United States Patent
Goshima et al.

(10) Patent No.: US 12,100,832 B2
(45) Date of Patent: Sep. 24, 2024

(54) POSITIVE ELECTRODE ACTIVE SUBSTANCE FOR NON-AQUEOUS ELECTROLYTE SECONDARY BATTERY, AND POSITIVE ELECTRODE FOR NON-AQUEOUS ELECTROLYTE SECONDARY BATTERY

(71) Applicant: Panasonic Intellectual Property Management Co., Ltd., Osaka (JP)

(72) Inventors: Yuji Goshima, Osaka (JP); Takeshi Ogasawara, Osaka (JP); Akihiro Kawakita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 506 days.

(21) Appl. No.: 17/610,386

(22) PCT Filed: Mar. 9, 2020

(86) PCT No.: PCT/JP2020/010045
§ 371 (c)(1),
(2) Date: Nov. 10, 2021

(87) PCT Pub. No.: WO2020/230424
PCT Pub. Date: Nov. 19, 2020

(65) Prior Publication Data
US 2022/0246911 A1    Aug. 4, 2022

(30) Foreign Application Priority Data
May 16, 2019  (JP) ................... 2019-092868

(51) Int. Cl.
*H01M 4/36* (2006.01)
*H01M 4/505* (2010.01)
*H01M 4/525* (2010.01)
*H01M 4/02* (2006.01)

(52) U.S. Cl.
CPC ........... *H01M 4/364* (2013.01); *H01M 4/505* (2013.01); *H01M 4/525* (2013.01); *H01M 2004/028* (2013.01)

(58) Field of Classification Search
CPC ...... H01M 4/364; H01M 4/505; H01M 4/525; H01M 2004/028
USPC ......................................... 429/221
See application file for complete search history.

(56) References Cited

U.S. PATENT DOCUMENTS

| | | | |
|---|---|---|---|
| 2010/0209771 A1* | 8/2010 | Shizuka | H01M 4/5815 429/231.95 |
| 2015/0171424 A1 | 6/2015 | Kawai | |
| 2017/0352885 A1 | 12/2017 | Kondo et al. | |
| 2017/0373309 A1 | 12/2017 | Kawai | |
| 2018/0261835 A1* | 9/2018 | Ogata | H01M 4/485 |
| 2019/0123347 A1 | 4/2019 | Kim et al. | |
| 2019/0165360 A1* | 5/2019 | Saruwatari | H01M 4/36 |
| 2019/0312279 A1 | 10/2019 | Otsuka et al. | |

FOREIGN PATENT DOCUMENTS

| | | |
|---|---|---|
| JP | 2010-40383 A | 2/2010 |
| JP | 2015-133318 A | 7/2015 |
| JP | 2016-127004 A | 7/2016 |
| WO | 2018/043515 A1 | 3/2018 |

OTHER PUBLICATIONS

International Search Report dated Jun. 2, 2020, issued in counterpart International Application No. PCT/ JP2020/010045. (2 pages).
The Extended European Search Report dated Jun. 24, 2022 for the related European Patent Application No. 20806792.6.

\* cited by examiner

*Primary Examiner* — James M Erwin
(74) *Attorney, Agent, or Firm* — WHDA, LLP

(57) ABSTRACT

This positive electrode active substance for a non-aqueous electrolyte secondary battery contains: a lithium-containing transition metal oxide having secondary particles formed by aggregation of primary particles; and at least a tungsten compound and a boron compound that are present between primary particles. The present invention is characterized in that: the amount of tungsten element eluted when the positive electrode active substance is washed for 5 minutes with a 0.01 mol/L aqueous solution of sodium hydroxide is 60% or less of the amount of tungsten element detected when the positive electrode active substance is dissolved in a mixed acid containing hydrofluoric acid, nitric acid and hydrochloric acid; and the amount of boron element eluted when the positive electrode active substance is washed for 1 minute with ion exchanged water is 80% or more of the amount of boron element detected when the positive electrode active substance is dissolved in hydrochloric acid.

7 Claims, No Drawings

POSITIVE ELECTRODE ACTIVE SUBSTANCE FOR NON-AQUEOUS ELECTROLYTE SECONDARY BATTERY, AND POSITIVE ELECTRODE FOR NON-AQUEOUS ELECTROLYTE SECONDARY BATTERY

TECHNICAL FIELD

The present disclosure relates to a positive electrode active material for non-aqueous electrolyte secondary battery and a positive electrode for non-aqueous electrolyte secondary battery.

BACKGROUND ART

Lithium-containing transition metal oxides are used as the positive electrode active material of a lithium ion secondary battery, which is a non-aqueous electrolyte secondary battery. For example, Patent Document 1 discloses a method of increasing the output of a lithium ion secondary battery, which is achieved by reducing the reaction resistance of the positive electrode by adhering a lithium tungstate compound to the surface of primary particles of a lithium-containing transition metal oxide represented by general formula $Li_zNi_{1-x-y}Co_xM_yO_2$ (where $0 \leq x \leq 0.35$, $0 \leq y \leq 0.35$, $0.95 \leq z \leq 1.30$, and M is at least one element selected from Mn, V, Mg, Mo, Nb, Ti, and Al).

CITATION LIST

Patent Literature

PATENT LITERATURE 1: Japanese Unexamined Patent Application Publication No. 2016-127004

SUMMARY

However, the method described in Patent Document 1 cannot sufficiently reduce the reaction resistance of the positive electrode, so that there is still room for improvement.

In view of the above, an object of the present disclosure is to lower the resistance of the positive electrode active material and thereby provide a non-aqueous electrolyte secondary battery in which the reaction resistance of the positive electrode is reduced and the output characteristics are improved as compared to in a conventional product.

A positive electrode active material for non-aqueous electrolyte secondary battery according to an aspect of the present disclosure is a positive electrode active material for non-aqueous electrolyte secondary battery, including a lithium-containing transition metal oxide having secondary particles formed by agglomeration of primary particles, and a tungsten compound and a boron compound that are present between at least the primary particles. The tungsten compound is present in an amount of 0.1 to 0.38% by mass, in terms of tungsten element, relative to a mass of the lithium-containing transition metal oxide. The boron compound is present in an amount of 0.006 to 0.17% by mass, in terms of boron element, relative to the mass of the lithium-containing transition metal oxide. An amount of tungsten element eluted when the positive electrode active material is washed with a 0.01 mol/L aqueous solution of sodium hydroxide for 5 minutes is 60% or less of an amount of tungsten element detected when the positive electrode active material is dissolved in a mixed acid containing hydrofluoric acid, nitric acid, and hydrochloric acid. An amount of boron element eluted when the positive electrode active material is washed with ion-exchanged water for 1 minute is 80% or more of an amount of boron element detected when the positive electrode active material is dissolved in hydrochloric acid.

A positive electrode for non-aqueous electrolyte secondary battery according to an aspect of the present disclosure includes a positive electrode mixture layer containing the above-described positive electrode active material and a conductive material present in an amount of 1% by mass or less relative to a mass of the positive electrode active material.

According to an aspect of the present disclosure, it is possible to obtain a low-resistance positive electrode active material for non-aqueous electrolyte secondary battery.

DESCRIPTION OF EMBODIMENTS

In a lithium-containing transition metal oxide, when there occurs a phenomenon called cation mixing in which a transition metal such as nickel occupies the sites for insertion and extraction of lithium ions during charging and discharging, the resistance of the positive electrode increases disadvantageously, and this results in the problem that high output cannot be obtained. For example, Patent Document 1 discloses a method of lowering the resistance of a positive electrode, which is achieved by forming a conductive path for lithium ions at the interface with the electrolyte solution by forming a lithium tungstate compound on the surface of primary particles of a lithium-containing transition metal oxide represented by general formula $Li_zNi_{1-x-y}Co_xM_yO_2$ (where $0 \leq x \leq 0.35$, $0 \leq y \leq 0.35$, $0.95 \leq z \leq 1.30$, and M is at least one element selected from Mn, V, Mg, Mo, Nb, Ti, and Al). However, as a result of diligent studies conducted by the present inventors, it was found that the resistance of the positive electrode cannot be sufficiently lowered by simply establishing a conductive path for lithium ions by addition of tungsten. In light of this, the present inventors proceeded with further studies, and produced a positive electrode active material by adding a tungsten compound and a boron compound to a lithium-containing transition metal oxide. The present inventors discovered that further reduction in the resistance of the positive electrode active material can be achieved in cases where the amount of tungsten element eluted when the positive electrode active material is washed with a 0.01 mol/L aqueous solution of sodium hydroxide for 5 minutes is 60% or less of the amount of tungsten element detected when the positive electrode active material is dissolved in a mixed acid containing hydrofluoric acid, nitric acid, and hydrochloric acid, and the amount of boron element eluted when the positive electrode active material is washed with ion-exchanged water for 1 minute is 80% or more of the amount of boron element detected when the positive electrode active material is dissolved in hydrochloric acid.

Detailed descriptions will now be given regarding the lithium-containing transition metal oxide, the tungsten compound, and the boron compound that constitute the positive electrode active material according to the present embodiment, and also regarding a method for producing the positive electrode active material.

Lithium-Containing Transition Metal Oxide

The lithium-containing transition metal oxide comprises secondary particles formed by agglomeration of primary particles. That is, in terms of improving the output characteristics of the non-aqueous electrolyte secondary battery, the lithium-containing transition metal oxide is composed of primary particles and secondary particles constituted by agglomeration of the primary particles, and the secondary particles preferably have voids and grain boundaries through which an electrolyte solution can permeate. The average particle size of the primary particles is, for example, preferably 500 nm or smaller, and more preferably in the range of 50 nm to 300 nm. The average particle size of the primary particles is an average value of major axis values of 10 respective primary particles, which are determined in a reflected electron image (hereinafter may be referred to as a SEM image) from an electron microscope showing the cross section of the particles. The central particle size (D50) of the secondary particles is, for example, preferably in the range of 1 μm to 50 μm, and more preferably in the range of 5 μm to 20 μm. Here, the central particle size means the central particle size (D50) at which the integrated volume value reaches 50% in a particle size distribution measured by a laser diffraction/scattering method.

The composition of the lithium-containing transition metal oxide may be represented by general formula $Li_\alpha Ni_{1-w-x-y-z} Co_w Al_x Mn_y M_z O_2$ (where $0.95 \leq \alpha \leq 1.05$, $0 \leq w \leq 0.09$, $0 \leq x \leq 0.06$, $0 \leq y \leq 0.1$, $0 \leq z \leq 0.01$, and M is at least one element selected from Mg, Sr, Si, Y, Mo, V, Ti, Fe, Zr, and Nb). In terms of increasing the energy density of the non-aqueous electrolyte secondary battery, the Ni content is preferably high, and therefore the sum of w, x, y, and z in the general formula preferably satisfies $0 \leq w+x+y+z \leq 0.15$, and more preferably satisfies $0 \leq w+x+y+z \leq 0.12$.

The content of Co contained in the lithium-containing transition metal oxide can be such that $0 \leq w \leq 0.03$. In that case, since a lower Co content results in a higher resistance value of the lithium-containing transition metal oxide, the effect of resistance reduction by the addition of tungsten and boron becomes more notable.

The lithium-containing transition metal oxide can be synthesized as follows.

(1) Formation of Transition Metal Composite Oxide

First, a transition metal composite hydroxide such as nickel-cobalt-aluminum composite hydroxide obtained by co-precipitation is subjected to heat treatment so as to obtain a transition metal composite oxide.

(2) Synthesis of Transition Metal Composite Oxide and Lithium Compound

Next, the transition metal composite oxide and a lithium compound such as lithium hydroxide or lithium carbonate are mixed, and by subjecting this mixture to heat treatment and then to pulverization, particles of lithium-containing transition metal oxide can be obtained.

Tungsten Compound

Examples of the tungsten compound (hereinafter may be referred to as the W compound) include tungsten oxide ($WO_3$), lithium tungstate ($Li_2WO_4$, $Li_4WO_5$, $Li_6W_2O_9$), ammonium tungstate, and the like. At least a part of the W compound is present between the primary particles of the lithium-containing transition metal oxide. From a SEM image showing the cross section of the secondary particles of the lithium-containing transition metal oxide contained in the positive electrode active material, it can be confirmed that tungsten element is present between the primary particles constituting the secondary particles. The W compound is present in an amount of 0.1 to 0.38% by mass, in terms of tungsten element, relative to the mass of the lithium-containing transition metal oxide. When the amount of the W compound is in this range, the resistance value of the positive electrode active material can be reduced.

The amount of tungsten element eluted when the positive electrode active material is washed with a 0.01 mol/L aqueous solution of sodium hydroxide for 5 minutes (hereinafter, this value may be referred to as the tungsten elution ratio (or W elution ratio)) is 60% or less of the amount of tungsten element detected when the positive electrode active material is dissolved in a mixed acid containing hydrofluoric acid, nitric acid, and hydrochloric acid. When the W elution ratio is within this range, it is supposed that much of the W compound is present between the primary particles of the lithium-containing transition metal oxide, and due to its synergistic effect with the state of distribution of the boron compound described further below, reduction in the resistance of the positive electrode active material becomes notable.

The W elution ratio is specifically calculated as follows.

(1) Measurement of Amount of Elution into Alkaline Aqueous Solution 1 g of the positive electrode active material is immersed in 10 mL of a 0.01 M aqueous solution of NaOH having room temperature, and stirred at 200 rpm for 5 minutes using a magnet stirrer. Subsequently, the solution and the positive electrode active material are separated by suction filtration. By performing ICP analysis of the separated filtrate, the amount of tungsten eluted in the alkaline aqueous solution (NaOH) is measured.

(2) Calculation of W Elution Ratio (Amount of Elution into Alkaline Aqueous Solution/Total Amount)

10 mL of an acid obtained by mixing a 46% hydrofluoric acid, a 60% nitric acid, and a 35% hydrochloric acid at a ratio of 1:1:1 is added to 1 g of the positive electrode active material, and dissolution is performed by heating at 80° C. for 2 hours. By performing ICP analysis of this solution, the total amount of tungsten is measured. The W elution ratio is calculated by dividing the amount of tungsten eluted in the alkaline aqueous solution by the total amount of tungsten.

Boron Compound

Examples of the boron compound (hereinafter may be referred to as the B compound) include boric acid ($H_3BO_3$), metaboric acid ($HBO_2$), tetraboric acid ($H_2B_4O_7$), and the like. The B compound may be boric acid.

At least a part of the B compound is present between the primary particles of the lithium-containing transition metal oxide. The B compound is present in an amount of 0.006 to 0.17% by mass, and preferably by 0.006 to 0.11% by mass, in terms of boron element, relative to the mass of the lithium-containing transition metal oxide.

The amount of boron element eluted when the positive electrode active material is washed with ion-exchanged water for 1 minute (hereinafter, this value may be referred to as the boron elution ratio (or B elution ratio)) is 80% or more of the amount of boron element detected when the positive electrode active material is dissolved in hydrochloric acid. When the B elution ratio is within this range, it is supposed that much of the B compound is at the surface of the secondary particles of the lithium-containing transition metal oxide, and due to its synergistic effect with the state of distribution of the W compound, reduction in the resistance of the positive electrode active material becomes notable. Since the B compound has Li-ion conductivity, exchange of Li ions between the electrolyte and the positive electrode active material is promoted at the surface of the secondary particles, and with the B compound being also present between the primary particles, Li ions received at the surface of the secondary particles are easily transferred to the surface of the primary particles. Further, the presence of the W compound at the surface of the primary particles enables smooth transfer of Li ions.

The B elution ratio is more preferably 93% to 98%, and still more preferably 95% to 98%. By setting the B elution ratio within the above-noted ranges when the W elution ratio is 60% or less, the reaction resistance can be further reduced.

The B elution ratio is specifically calculated as follows.

(1) Measurement of Amount of Elution into Water 1 g of the positive electrode active material is immersed in 30 mL of ion-exchanged water having room temperature, and stirred at 200 rpm for 1 minute using a magnetic stirrer. Subsequently, the solution and the positive electrode active material are separated by suction filtration. By performing ICP analysis of the separated filtrate, the amount of boron eluted in the ion-exchanged water is measured.

(2) Calculation of B Elution Ratio (Amount of Elution into Water/Total Amount)

10 mL of a 6 mol/L hydrochloric acid is added to 0.5 g of the positive electrode active material, and dissolution is performed by heating at 80° C. for 2 hours. By performing ICP analysis of this solution, the total amount of boron is measured. The B elution ratio is calculated by dividing the amount of boron eluted in the ion-exchanged water by the total amount of boron.

Method of Producing Positive Electrode Active Material

Washing Step

First, the lithium-containing transition metal oxide is washed with water and dehydrated to obtain a cake-like composition. Here, a lithium-containing transition metal oxide in particulate form that is obtained in a synthesis process can be used. By washing with water, it is possible to remove an unreacted part of the lithium compound added in the synthesis process of the lithium-containing transition metal oxide, and to also remove any impurities other than the lithium compound. At the time of washing with water, for example, 300 g to 5000 g of the lithium-containing transition metal oxide can be added to each 1 L of water. The washing with water can be repeated a plurality of times. Dehydration after the washing with water can be performed using, for example, a filter press. By dehydrating, the moisture content of the cake-like composition after washing can be reduced to 10% by mass or less. The moisture content of the cake-like composition is preferably 2% by mass to 10% by mass, and more preferably 4% by mass to 8% by mass, in terms of facilitating spreading of tungsten, which is contained in a tungsten compound or a tungsten-containing solution to be added later, over the surface of the lithium-containing transition metal oxide. In determining the moisture content of the cake-like composition, 10 g of the cake-like composition is dried by being allowed to stand in a vacuum at 120° C. for 2 hours, and the moisture content value is calculated by dividing the weight change of the cake-like composition before and after the drying by the weight of the cake-like composition before the drying. The moisture content of a tungsten-added mixture described below is also calculated in the same manner.

Tungsten Addition Step

Next, a tungsten compound or a tungsten-containing solution is added to the cake-like composition to obtain a tungsten-added mixture. Even after the washing, a part of the lithium compound remains in the cake-like composition, and at the surface of the lithium-containing transition metal oxide contained in the cake-like composition, the residual lithium compound dissolves into the water contained in the cake-like composition to thereby produce an alkaline aqueous solution.

When a tungsten compound is added to the cake-like composition, the tungsten compound dissolves into the alkaline aqueous solution and spreads over the entire surface of the lithium-containing transition metal oxide. Examples of the tungsten compound to be directly added to the cake-like composition include tungsten oxide ($WO_3$), lithium tungstate ($Li_2WO_4$, $Li_4WO_5$, $Li_6W_2O_9$), and the like.

Alternatively, a tungsten-containing solution may be added to the cake-like composition. The tungsten concentration in the tungsten-containing solution is, for example, 0.05 mol/L or higher, and preferably 0.1 mol/L to 1 mol/L. The tungsten-containing solution is not particularly limited so long as it contains tungsten, but is preferably obtained by dissolving, in an aqueous solution of lithium hydroxide, a tungsten compound that is easily soluble in an alkaline solution, such as tungsten oxide, lithium tungstate, or ammonium tungstate. In order to prevent high moisture content in the tungsten-added mixture, it is preferable to add a tungsten compound, rather than a tungsten-containing solution, to the cake-like composition.

Further, the tungsten-added mixture may be dried at 150 to 200° C. By drying, the moisture content of the tungsten-added mixture can be adjusted. The drying atmosphere can for example be vacuum. The drying time is not particularly limited, but can be 0.5 to 10 hours. After drying, the tungsten-added mixture may be cooled inside the drying oven or the like.

Boron Addition Step

Next, boron is added to the tungsten-added mixture. By adding boron to the tungsten-added mixture, a conductive path for lithium ions can be established by the synergistic effect of tungsten and boron, so that the resistance of the positive electrode active material can be further reduced. Further, by having tungsten and boron adhered to and coated on the surface of the lithium-containing transition metal oxide, the surface structure of the lithium-containing transition metal oxide can be maintained at the time of discharging and charging.

Examples of the boron compound to be directly added to the tungsten-added mixture include boric acid ($H_3BO_3$), metaboric acid ($HBO_2$), tetraboric acid ($H_2B_4O_7$), and the like. The particle size of the boron compound is not particularly limited, but is preferably 100 μm or smaller, more preferably 50 µm or smaller, and particularly preferably 10 µm or smaller considering dispersibility. Alternatively, it is possible to add a boron-containing solution to the tungsten-added mixture. The boron concentration in the boron-containing solution is, for example, 0.05 mol/L to 2 mol/L, and preferably 0.1 mol/L to 1 mol/L. The boron-containing solution is not particularly limited so long as it contains boron, but may for example contain boric acid, metaboric acid, tetraboric acid, or the like, and is preferably such that the pH of the boron-containing solution is adjusted to 7 or higher by further adding lithium hydroxide (LiOH), lithium carbonate ($Li_2CO_3$) or the like. In that case, deterioration of the surface of the tungsten-added mixture due to acid can be prevented.

The tungsten-added mixture to which the boron compound has been added may be dried at 150 to 200° C. By drying, the amount of boron present between the secondary particles of the lithium-containing transition metal oxide can be increased. The drying atmosphere can for example be vacuum. The drying time is not particularly limited, but is preferably 0.5 to 10 hours in order to diffuse boron. The heating rate until reaching the predetermined heat treatment temperature is preferably 1° C./min to 10° C./min.

Next, the tungsten-added mixture to which the boron compound has been added is subjected to heat treatment at a temperature above 180° C. to 330° C., so as to produce a positive electrode active material. By heat-treating at above 180° C. to 330° C., which is a temperature higher than the melting point of the boron compound, the boron compound or the boron-containing solution can be melted and spread over the entire surface of the lithium-containing transition metal oxide. The heat treatment time is not particularly limited, but is preferably 0.5 hours to 15 hours in order to sufficiently melt the boron compound or the boron-containing solution.

A cooling step can be performed after the heat treatment step. By the cooling step, the boron-containing compound melted by the heat treatment can be redeposited. The cooling step is not particularly limited so long as it can lower the temperature of the tungsten-added mixture, but can for example involve performing a rapid cooling in which the temperature of the tungsten-added mixture is lowered to 100° C. or lower in 30 minutes after the heat treatment step.

A non-aqueous electrolyte secondary battery in which the above-described positive electrode active material is employed is obtained by, for example, placing an electrode assembly, which is formed by laminating or winding electrodes (i.e., positive electrode and negative electrode) and a separator, in a housing made of a battery can or a laminate material, together with a non-aqueous electrolyte. A positive electrode, a negative electrode, a separator, and a non-aqueous electrolyte according to the present embodiment are as described below, for example.

Positive Electrode

The positive electrode includes a positive electrode current collector such as a metal foil and a positive electrode mixture layer formed on the positive electrode current collector. For the positive electrode current collector, it is possible to use: a foil of a metal, such as aluminum, that is stable in the potential range of the positive electrode; a film having such a metal disposed on its surface layer; or the like.

The positive electrode mixture layer contains the positive electrode active material, and preferably additionally contains a conductive material, a binder, and the like. The conductive material is preferably present in an amount of 1% by mass or less relative to the mass of the positive electrode active material. The positive electrode can be produced by, for example, applying a positive electrode mixture slurry containing the positive electrode active material, the conductive material, the binder, and the like onto the surfaces of the positive electrode current collector, drying the applied films, and then compressing the films to thereby form positive electrode mixture layers on both sides of the positive electrode current collector.

As the conductive material, carbon powders such as carbon black, acetylene black, Ketjen black, graphite, and carbon nanotubes may be used alone or by combining two or more thereof.

Examples of the binder include a fluorine-based polymer, a rubber-based polymer, and the like. Examples of the fluorine-based polymer include polytetrafluoroethylene (PTFE), polyvinylidene fluoride (PVdF), modified products of the foregoing, and the like, while examples of the rubber-based polymer include ethylene-propylene-isoprene copolymer, ethylene-propylene-butadiene copolymer, and the like. These may be used alone or by combining two or more thereof.

Negative Electrode

The negative electrode includes a negative electrode current collector such as a metal foil and a negative electrode mixture layer formed on the negative electrode current collector. For the negative electrode current collector, it is possible to use: a foil of a metal, such as copper, that is stable in the potential range of the negative electrode; a film having such a metal disposed on its surface layer; or the like. The negative electrode mixture layer contains a negative electrode active material, and preferably additionally contains a thickener, a binder, and the like. The negative electrode can be produced by, for example, applying a negative electrode mixture slurry, which is prepared by dispersing the negative electrode active material, the thickener, and the binder in water in a predetermined weight ratio, onto the surfaces of the negative electrode current collector, drying the applied films, and then compressing the films to thereby form negative electrode mixture layers on both sides of the negative electrode current collector.

As the negative electrode active material, a carbon material capable of occluding and releasing lithium ions can be used. Other than graphite, it is possible to use non-graphitizing carbon, easily graphitizable carbon, fibrous carbon, coke, carbon black, and the like. In addition, as for non-carbon materials, it is possible to use silicon, tin, and alloys and oxides containing these substances as the main component.

As the binder, while PTFE or the like can be used as with the positive electrode, a styrene-butadiene copolymer (SBR) or a modified product thereof may be used. As the thickener, carboxymethyl cellulose (CMC) or the like can be used.

Non-Aqueous Electrolyte

As the non-aqueous solvent (i.e., organic solvent) of the non-aqueous electrolyte, carbonates, lactones, ethers, ketones, esters, and the like can be used, and two or more of these solvents can be mixed and used. For example, it is possible to use: cyclic carbonates such as ethylene carbonate, propylene carbonate, and butylene carbonate; chain carbonates such as dimethyl carbonate, ethyl methyl carbonate, and diethyl carbonate; a mixed solvent of a cyclic carbonate and a chain carbonate; and the like.

As the electrolyte salt of the non-aqueous electrolyte, $LiPF_6$, $LiBF_4$, $LiCF_3SO_3$, and the like, and mixtures of these salts can be used. The amount of the electrolyte salt dissolved in the non-aqueous solvent can be, for example, 0.5 to 2.0 mol/L.

Separator

As the separator, a porous sheet or the like having ion permeability and insulating property is used. Specific examples of the porous sheet include a microporous thin film, a woven fabric, and a non-woven fabric. As the material of the separator, olefin resins such as polyethylene and polypropylene, cellulose, and the like are preferred. The separator may be a laminate having a cellulose fiber layer and a fiber layer of thermoplastic resin such as olefin resin. Further, the separator may be a multilayer separator including a polyethylene layer and a polypropylene layer, and a separator having a surface coated with a material such as aramid resin or ceramic may also be used.

EXAMPLES

While the present disclosure will now be described further using Examples, the present disclosure is not limited to these Examples.

Preparation of Positive Electrode Active Material

Example 1

A positive electrode active material was prepared by the following procedure.

(1) Preparation of Lithium-Containing Transition Metal Oxide

A nickel-cobalt-aluminum composite hydroxide represented by $Ni_{0.91}Co_{0.05}Al_{0.04}(OH)_2$ obtained by co-precipitation was subjected to heat treatment at 500° C. to obtain an oxide. LiOH and this oxide were mixed in Ishikawa's grinding mortar such that the molar ratio of Li to the entire transition metals was 1.02:1, and a mixture was thereby obtained. This mixture was put into a firing furnace and heated from room temperature to 650° C. at a heating rate of 2.0° C./min under an oxygen stream having an oxygen concentration of 95% (at a flow rate of 2 mL/min per 10 cm³ and 5 L/min per 1 kg of the mixture), and after that, the mixture was fired from 650° C. to 710° C. at a heating rate of 0.5° C./min. As a result, particles of lithium-nickel-cobalt-aluminum composite oxide (i.e., lithium-containing transition metal oxide) represented by $Li_{1.01}Ni_{0.91}Co_{0.05}Al_{0.04}O_2$ and having an average secondary particle size of approximately 11 μm were obtained. The composition of the lithium-containing transition metal oxide particles was measured using an ICP optical emission spectroscopic analyzer.

(2) Washing Step 800 g of pure water was added to 1000 g of the above lithium-nickel-cobalt-aluminum composite oxide particles, and after stirring, filtration/separation and dehydration were performed to obtain a cake-like composition resulting after the washing step. The moisture content of the cake-like composition was 4% by mass.

(3) Tungsten Addition Step

Next, $WO_3$ powder was added to the above cake-like composition in an amount of 0.19% by mass, in terms of tungsten element, relative to the lithium-containing transition metal oxide. The mixture was heated to 180° C. in a vacuum so as to perform drying for 3 hours, and then subjected to furnace cooling to room temperature to thereby obtain a tungsten-added mixture having a moisture content of 0.08% by mass.

(4) Boron Addition Step

Boric acid was added to the above tungsten-added mixture in an amount of 0.01% by mass, in terms of boron element, relative to the lithium-containing transition metal oxide, and heat treatment was performed for 3 hours at 250° C. in atmospheric air. The tungsten-added mixture after the heat treatment step was cooled to attain 100° C. or lower within 30 minutes, and the positive electrode active material of Example 1 was thereby obtained. Regarding the obtained positive electrode active material, the W elution ratio of was 55%, and the B elution ratio was 100%.

Example 2

A positive electrode active material was prepared in the same manner as in Example 1 except that, in the boron addition step, at a point after the addition of boric acid and before the heat treatment, the mixture was heated to 180° C. in a vacuum to perform drying for 4 hours. Regarding the obtained positive electrode active material, the W elution ratio was 53%, and the B elution ratio was 97%. By drying in a vacuum, more boric acid became present between the primary particles as compared to in Example 1, so that the B elution ratio became lower than in Example 1.

Examples 3 to 7

A positive electrode active material was prepared in the same manner as in Example 1 except that the added amounts of $WO_3$ powder and boric acid were changed as shown in Table 1. The W elution ratio and the B elution ratio were as shown in Table 1.

Example 8

A positive electrode active material was prepared in the same manner as in Example 1 except for the boron addition step. In the boron addition step, instead of boric acid, a boron-containing aqueous solution was added to the tungsten-added mixture. The boron-containing aqueous solution was prepared by adding 0.045 g of boric acid to an aqueous solution having 0.15 g of lithium hydroxide (LiOH) dissolved in 10.5 g of pure water, and stirring while heating at 60° C. The prepared boron-containing aqueous solution was added to the tungsten-added mixture in an amount of 0.01% by mass, in terms of boron element, relative to the lithium-containing transition metal oxide. The tungsten-added mixture to which the boron-containing aqueous solution was added was held in a vacuum at room temperature for 24 hours, then heated to 180° C. to perform drying for 3 hours, and then subjected to furnace cooling to room temperature, as a result of which a tungsten-added mixture having a moisture content of 0.08% by mass was obtained. Subsequently, heat treatment was carried out in atmospheric air at 250° C. for 3 hours, and the mixture was cooled to attain 100° C. or lower within 30 minutes to thereby obtain the positive electrode active material of Example 8. Regarding the obtained positive electrode active material, the W elution ratio was 57%, and the B elution ratio was 81%. By adding boric acid in the form of an aqueous solution and further holding the mixture in a vacuum at room temperature, more boric acid became present between the primary particles as compared to in Example 2, so that the B elution ratio became lower than in Example 2.

Comparative Example 1

A positive electrode active material was prepared in the same manner as in Example 1 except that the boron addition step was not performed. The W elution ratio of the obtained positive electrode active material was 60%.

Comparative Example 2

A positive electrode active material was prepared in the same manner as in Example 1 except that the tungsten addition step was not performed, but instead the temperature was raised to 180° C. in a vacuum so as to perform drying for 3 hours, and then furnace cooling was carried out to room temperature, after which the boron addition step was performed. The B elution ratio of the obtained positive electrode active material was 100%.

Comparative Example 3

A positive electrode active material was prepared in the same manner as in Example 1 except that the tungsten addition step and the boron addition step were not performed, but instead the temperature was raised to 180° C. in a vacuum so as to perform drying for 3 hours, and then furnace cooling was carried out to room temperature to thereby obtain a cake-like composition having a moisture content of 0.08% by mass.

Comparative Examples 4 and 5

A positive electrode active material was prepared in the same manner as in Example 1 except that the added amounts of $WO_3$ powder and boric acid were changed as shown in Table 1. The W elution ratio and the B elution ratio were as shown in Table 1.

Comparative Example 6

In the same manner as in Example 1, after the preparation of the lithium-containing transition metal oxide, the washing step was performed. Subsequently, a boron-containing aqueous solution was added to the cake-like composition. The boron-containing aqueous solution was prepared by adding 0.045 g of boric acid to an aqueous solution having 0.15 g of lithium hydroxide (LiOH) dissolved in 10.5 g of pure water, and stirring while heating at 60° C. The prepared boron-containing aqueous solution was added to the cake-like composition in an amount of 0.01% by mass, in terms of boron element, relative to the lithium-containing transition metal oxide. The cake-like composition to which the boron-containing aqueous solution was added was held in a vacuum at room temperature for 24 hours, then heated to 180° C. so as to perform drying for 3 hours, and then subjected to furnace cooling to room temperature, as a result of which a boron-added mixture having a moisture content of 0.08% by mass was obtained. After that, heat treatment was performed for 3 hours in atmospheric air at 250° C.

Next, onto the above boron-added mixture having a temperature of 200° C. or higher, a tungsten-containing aqueous solution was sprayed. The tungsten-containing aqueous solution was prepared by adding 2.4 g of $WO_3$ powder to an aqueous solution having 1 g of lithium hydroxide (LiOH) dissolved in 20 g of pure water, and stirring while heating at 60° C. The prepared tungsten-containing aqueous solution was added to the boron-added mixture in an amount of 0.19% by mass, in terms of tungsten element, relative to the lithium-containing transition metal oxide. The boron-added mixture to which the tungsten-containing aqueous solution was added was heated to 180° C. in a vacuum so as to perform drying for 3 hours, and then subjected to furnace cooling to room temperature to thereby obtain the positive electrode active material of Comparative Example 6. Regarding the obtained positive electrode active material, the W elution ratio of was 100%, and the B elution ratio was 72%. By adding boric acid in the form of an aqueous solution and further holding the mixture in a vacuum at room temperature, more boric acid became present between the primary particles as compared to in Example 2, so that the B elution ratio became lower than in Example 2. Further, by spraying tungsten onto the boron-added mixture having a temperature of 200° C. or higher, moisture evaporated in a short time and the tungsten compound remained on the surface of the secondary particles, so that the W elution ratio became higher than in Example 1.

Comparative Example 7

In the same manner as in Example 1, after the preparation of the lithium-containing transition metal oxide, the washing step was performed. Subsequently, the temperature was raised to 180° C. in a vacuum so as to perform drying for 3 hours, and then furnace cooling was carried out to room temperature to thereby obtain a cake-like composition having a moisture content of 0.08% by mass. Boric acid was added to this cake-like composition in an amount of 0.01% by mass, in terms of boron element, relative to the lithium-containing transition metal oxide, and heat treatment was performed for 3 hours at 250° C. in atmospheric air to obtain a boron-added mixture. Next, onto this boron-added mixture having a temperature of 200° C. or higher, a tungsten-containing aqueous solution was sprayed. The tungsten-containing aqueous solution was prepared by adding 2.4 g of $WO_3$ powder to an aqueous solution having 1 g of lithium hydroxide (LiOH) dissolved in 20 g of pure water, and stirring while heating at 60° C. The prepared tungsten-containing aqueous solution was added to the boron-added mixture in an amount of 0.19% by mass, in terms of tungsten element, relative to the lithium-containing transition metal oxide. The boron-added mixture to which the tungsten-containing aqueous solution was added was heated to 180° C. in a vacuum so as to perform drying for 3 hours, and then subjected to furnace cooling to room temperature to thereby obtain the positive electrode active material of Comparative Example 7. Regarding the obtained positive electrode active material, the W elution ratio of was 100%, and the B elution ratio was 96%. For the same reason as in Comparative Example 6, the W elution ratio became higher than in Example 1. Further, the B elution ratio was slightly lower than in Example 1 because more tungsten was present on the surface of the secondary particles as compared to in Example 1.

Preparation of Positive Electrode

Each of the positive electrode active materials prepared in Examples 1 to 8 and Comparative Examples 1 to 7 was mixed with acetylene black and polyvinylidene fluoride in a mass ratio of 40:2:1, and formed into thin pellets while being kneaded using an agate mortar and pestle. After that, the pellets were rolled to a predetermined thickness using a roller, and then punched into a predetermined circular shape to form a positive electrode.

Preparation of Non-Aqueous Electrolyte

Ethylene carbonate (EC), methyl ethyl carbonate (MEC), and dimethyl carbonate (DMC) were mixed in a volume ratio of 20:5:75. Into this mixed solvent, lithium hexafluorophosphate ($LiPF_6$) was dissolved to achieve a concentration of 1.2 mol/L, and a non-aqueous electrolyte was thereby prepared.

Preparation of Test Cell

An electrode assembly was prepared by laminating the positive electrode prepared in the above and a negative electrode made of lithium metal to face each other via a separator. Subsequently, this electrode assembly and the above non-aqueous electrolyte were placed in a coin-shaped outer housing made of aluminum, and sealing was carried out by crimping with a press machine to thereby produce a test cell. Test cells were produced in the same manner also for the other Examples and Comparative Examples.

Measurement of Reaction Resistance

With respect to each of the above test cells, under a temperature condition of 25° C., charging was performed with a constant current of 0.7 mA until the cell voltage reached 4.3 V, and then with a constant voltage of 4.3V until the current value reached 0.07 mA. Subsequently, discharging was performed with a constant current of 0.7 mA until the cell voltage reached 2.5 V. Next, under a temperature condition of 25° C., charging was again performed with a constant current of 0.7 mA until the cell voltage reached 4.3 V, and then with a constant voltage of 4.3V until the current value reached 0.07 mA. After that, AC impedance of the test cell at 20 kHz to 0.01 Hz was measured using an AC impedance measuring device. From the measured data, a Cole-Cole plot was drawn, and reaction resistance was determined based on the size of the arc between 10 Hz and 0.1 Hz. The reaction resistance values shown in Table 1 are such that the reaction resistance value of the test cell containing the positive electrode active material of Comparative Example 1 is assumed to be 100, and the reaction resistance values of the other test cells are represented relative thereto.

TABLE 1

| | Amount of Co (mol %) | Amount of W Added (mass %) | W Elution Ratio % | Amount of B Added (mass %) | B Elution Ratio % | Reaction Resistance |
|---|---|---|---|---|---|---|
| Example 1 | 5 | 0.19 | 55 | 0.01 | 100 | 68 |
| Example 2 | 5 | 0.19 | 53 | 0.01 | 97 | 58 |
| Example 3 | 5 | 0.19 | 54 | 0.006 | 100 | 69 |
| Example 4 | 5 | 0.19 | 52 | 0.11 | 100 | 72 |
| Example 5 | 5 | 0.19 | 53 | 0.17 | 100 | 90 |
| Example 6 | 5 | 0.38 | 56 | 0.01 | 100 | 82 |
| Example 7 | 5 | 0.10 | 55 | 0.01 | 100 | 68 |
| Example 8 | 5 | 0.19 | 57 | 0.01 | 81 | 73 |
| Comparative Example 1 | 5 | 0.19 | — | — | 60 | 100 |
| Comparative Example 2 | 5 | — | — | 0.01 | 100 | 381 |
| Comparative Example 3 | 5 | — | — | — | — | 132 |
| Comparative Example 4 | 5 | 0.57 | 52 | 0.01 | 100 | 113 |
| Comparative Example 5 | 5 | 0.19 | 53 | 0.23 | 100 | 122 |
| Comparative Example 6 | 5 | 0.19 | 100 | 0.01 | 72 | 144 |
| Comparative Example 7 | 5 | 0.19 | 100 | 0.01 | 96 | 125 |

Example 9

A positive electrode active material was prepared in the same manner as in Example 1 except that the composition of the lithium-containing transition metal oxide was changed to $Li_{1.01}Ni_{0.88}Co_{0.09}Al_{0.03}O_2$ by changing the composition of the nickel-cobalt-aluminum composite hydroxide. Regarding the obtained positive electrode active material, the W elution ratio was 59%, and the B elution ratio was 100%.

Comparative Example 8

A positive electrode active material was prepared in the same manner as in Comparative Example 1 except that the composition of the lithium-containing transition metal oxide was changed to $Li_{1.01}Ni_{0.88}Co_{0.09}Al_{0.03}O_2$ by changing the composition of the nickel-cobalt-aluminum composite hydroxide. The W elution ratio of the obtained positive electrode active material was 55%.

Comparative Example 9

A positive electrode active material was prepared in the same manner as in Comparative Example 3 except that the composition of the lithium-containing transition metal oxide was changed to $Li_{1.01}Ni_{0.88}Co_{0.09}Al_{0.03}O_2$ by changing the composition of the nickel-cobalt-aluminum composite hydroxide.

Using the positive electrode active materials obtained in Example 9 and Comparative Examples 8 to 9, test cells were prepared in the same manner as in Example 1, and reaction resistance was measured. The reaction resistance values shown in Table 2 are such that the reaction resistance value of the test cell containing the positive electrode active material of Comparative Example 8 is assumed to be 100, and the reaction resistance values of the other test cells are represented relative thereto.

TABLE 2

| | Amount of Co (mol %) | Amount of W Added (mass %) | W Elution Ratio % | Amount of B Added (mass %) | B Elution Ratio % | Reaction Resistance |
|---|---|---|---|---|---|---|
| Example 9 | 9 | 0.19 | 59 | 0.01 | 100 | 83 |
| Comparative Example 8 | 9 | 0.19 | 55 | — | — | 100 |
| Comparative Example 9 | 9 | — | — | — | — | 114 |

Example 10

A positive electrode active material was prepared in the same manner as in Example 1 except that the composition of the lithium-containing transition metal oxide was changed to $Li_{1.01}Ni_{0.92}Co_{0.05}Al_{0.03}O_2$ by changing the composition of the nickel-cobalt-aluminum composite hydroxide. Regarding the obtained positive electrode active material, the W elution ratio was 58%, and the B elution ratio was 100%.

Comparative Example 10

A positive electrode active material was prepared in the same manner as in Comparative Example 1 except that the composition of the lithium-containing transition metal oxide was changed to $Li_{1.01}Ni_{0.92}Co_{0.05}Al_{0.03}O_2$ by changing the composition of the nickel-cobalt-aluminum composite hydroxide. The W elution ratio of the obtained positive electrode active material was 57%.

Using the positive electrode active materials obtained in Example 10 and Comparative Example 10, test cells were prepared in the same manner as in Example 1, and reaction resistance was measured. The reaction resistance values shown in Table 3 are such that the reaction resistance value of the test cell containing the positive electrode active material of Comparative Example 10 is assumed to be 100, and the reaction resistance value of the test cell containing the positive electrode active material of Example 10 is represented relative thereto.

TABLE 3

| | Amount of Co (mol %) | Amount of W Added (mass %) | W Elution Ratio % | Amount of B Added (mass %) | B Elution Ratio % | Reaction Resistance |
|---|---|---|---|---|---|---|
| Example 10 | 0 | 0.19 | 58 | 0.01 | 100 | 49 |
| Comparative Example 10 | 0 | 0.19 | — | — | 57 | 100 |

Comparative Example 11

A positive electrode active material was prepared in the same manner as in Example 1 except that the composition of the lithium-containing transition metal oxide was changed to $Li_{1.01}Ni_{0.82}Co_{0.15}Al_{0.03}O_2$ by changing the composition of the nickel-cobalt-aluminum composite hydroxide. Regarding the obtained positive electrode active material, the W elution ratio was 52%, and the B elution ratio was 100%.

Comparative Example 12

A positive electrode active material was prepared in the same manner as in Comparative Example 1 except that the composition of the lithium-containing transition metal oxide was changed to $Li_{1.01}Ni_{0.82}Co_{0.15}Al_{0.03}O_2$ by changing the composition of the nickel-cobalt-aluminum composite hydroxide. The W elution ratio of the obtained positive electrode active material was 58%.

Comparative Example 13

A positive electrode active material was prepared in the same manner as in Comparative Example 3 except that the composition of the lithium-containing transition metal oxide was changed to $Li_{1.01}Ni_{0.82}Co_{0.15}Al_{0.03}O_2$ by changing the composition of the nickel-cobalt-aluminum composite hydroxide.

Using the positive electrode active materials obtained in Comparative Examples 11 to 13, test cells were prepared in the same manner as in Example 1, and reaction resistance was measured. The reaction resistance values shown in Table 4 are such that the reaction resistance value of the test cell containing the positive electrode active material of Comparative Example 11 is assumed to be 100, and the reaction resistance values of the other test cells are represented relative thereto.

TABLE 4

| | Amount of Co (mol %) | Amount of W Added (mass %) | W Elution Ratio % | Amount of B Added (mass %) | B Elution Ratio % | Reaction Resistance |
|---|---|---|---|---|---|---|
| Comparative Example 11 | 15 | 0.19 | 52 | 0.01 | 100 | 100 |
| Comparative Example 12 | 15 | 0.19 | 58 | — | — | 100 |
| Comparative Example 13 | 15 | — | — | — | — | 100 |

Example 11

A positive electrode active material was prepared in the same manner as in Example 1 except that the composition of the lithium-containing transition metal oxide was changed to $Li_{1.01}Ni_{0.92}Co_{0.02}Al_{0.02}Mn_{0.04}O_2$ by changing the composition of the nickel-cobalt-aluminum composite hydroxide. Regarding the obtained positive electrode active material, the W elution ratio was 56%, and the B elution ratio was 100%.

Comparative Example 14

A positive electrode active material was prepared in the same manner as in Comparative Example 1 except that the composition of the lithium-containing transition metal oxide was changed to $Li_{1.01}Ni_{0.92}Co_{0.02}Al_{0.02}Mn_{0.04}O_2$ by changing the composition of the nickel-cobalt-aluminum composite hydroxide. The W elution ratio of the obtained positive electrode active material was 54%.

Using the positive electrode active materials obtained in Example 11 and Comparative Example 14, test cells were prepared in the same manner as in Example 1, and reaction resistance was measured. The reaction resistance values shown in Table 5 are such that the reaction resistance value of the test cell containing the positive electrode active material of Comparative Example 14 is assumed to be 100, and the reaction resistance value of the test cell containing the positive electrode active material of Example 11 is represented relative thereto.

TABLE 5

| | Amount of Co (mol %) | Amount of W Added (mass %) | W Elution Ratio % | Amount of B Added (mass %) | B Elution Ratio % | Reaction Resistance |
|---|---|---|---|---|---|---|
| Example 11 | 2 | 0.19 | 56 | 0.01 | 100 | 53 |
| Comparative Example 14 | 2 | 0.19 | 54 | — | — | 100 |

In Examples 1 to 11, it was confirmed that by adding boron in addition to tungsten and further setting the W elution ratio and the B elution ratio to within predetermined ranges, the reaction resistance becomes lower than in Comparative Example 1. On the other hand, in Comparative Examples 2 to 7, the reaction resistance became increased as compared to in Comparative Example 1.

Further, from Examples 1, 9, 10 and 11, it was confirmed that when the amount of Co contained in the lithium-containing transition metal oxide is smaller, the effect of adding boron is greater. On the other hand, in Comparative Examples 11 and 12, with the amount of Co being 15 mol %, the effect of adding boron was not obtained.

The invention claimed is:

1. A positive electrode active material for non-aqueous electrolyte secondary battery, comprising:
   a lithium-containing transition metal oxide having secondary particles formed by agglomeration of primary particles; and
   a tungsten compound and a boron compound that are present between at least the primary particles, wherein
   the tungsten compound is present in an amount of 0.1 to 0.38% by mass, in terms of tungsten element, relative to a mass of the lithium-containing transition metal oxide;
   the boron compound is present in an amount of 0.006 to 0.17% by mass, in terms of boron element, relative to the mass of the lithium-containing transition metal oxide;
   an amount of tungsten element eluted when the positive electrode active material is washed with a 0.01 mol/L aqueous solution of sodium hydroxide for 5 minutes is 60% or less of an amount of tungsten element detected when the positive electrode active material is dissolved in a mixed acid containing hydrofluoric acid, nitric acid, and hydrochloric acid; and
   an amount of boron element eluted when the positive electrode active material is washed with ion-exchanged water for 1 minute is 80% or more of an amount of boron element detected when the positive electrode active material is dissolved in hydrochloric acid.

2. The positive electrode active material for non-aqueous electrolyte secondary battery according to claim 1, wherein a composition of the lithium-containing transition metal oxide is represented by general formula $Li_\alpha Ni_{1-w-x-y-z} Co_w Al_x Mn_y M_z O_2$ (where $0.95 \leq \alpha \leq 1.05$, $0 \leq w \leq 0.09$, $0 \leq x \leq 0.06$, $0 \leq y \leq 0.1$, $0 \leq x \leq 0.01$, and M is at least one element selected from Mg, Sr, Si, Y, Mo, V, Ti, Fe, Zr, and Nb).

3. The positive electrode active material for non-aqueous electrolyte secondary battery according to claim 2, wherein a content of Co contained in the lithium-containing transition metal oxide is such that $0 \leq w \leq 0.03$.

4. The positive electrode active material for non-aqueous electrolyte secondary battery according to claim 1, wherein the boron compound contains boric acid.

5. The positive electrode active material for non-aqueous electrolyte secondary battery according to claim 1, wherein the boron compound is present in an amount of 0.006 to 0.11% by mass, in terms of boron element, relative to the mass of the lithium-containing transition metal oxide.

6. The positive electrode active material for non-aqueous electrolyte secondary battery according to claim 1, wherein the amount of boron element eluted when the positive electrode active material is washed with ion-exchanged water for 1 minute is 93% to 98% of the amount of boron element detected when the positive electrode active material is dissolved in hydrochloric acid.

7. A positive electrode for non-aqueous electrolyte secondary battery, comprising a positive electrode mixture layer containing:
   the positive electrode active material according to claim 1; and
   a conductive material present in an amount of 1% by mass or less relative to a mass of the positive electrode active material.

* * * * *